Jan. 20, 1942.  W. E. SANBORN  2,270,561
METHOD OF AND APPARATUS FOR MAKING DENTURES
Filed Oct. 3, 1938  8 Sheets-Sheet 1

Inventor
William E. Sanborn,
By
Attorneys

Inventor
William E. Sanborn
Attorneys

Jan. 20, 1942.   W. E. SANBORN   2,270,561
METHOD OF AND APPARATUS FOR MAKING DENTURES
Filed Oct. 3, 1938   8 Sheets-Sheet 3

Inventor
William E. Sanborn,
By
Attorneys

Jan. 20, 1942.　　　W. E. SANBORN　　　2,270,561
METHOD OF AND APPARATUS FOR MAKING DENTURES
Filed Oct. 3, 1938　　　8 Sheets-Sheet 4

Inventor
William E. Sanborn,
By

Attorneys

Jan. 20, 1942. W. E. SANBORN 2,270,561
METHOD OF AND APPARATUS FOR MAKING DENTURES
Filed Oct. 3, 1938 8 Sheets-Sheet 5

Inventor
William E. Sanborn
Attorneys

Jan. 20, 1942. W. E. SANBORN 2,270,561
METHOD OF AND APPARATUS FOR MAKING DENTURES
Filed Oct. 3, 1938 8 Sheets-Sheet 7

Inventor
William E. Sanborn,
Attorneys

Patented Jan. 20, 1942

2,270,561

UNITED STATES PATENT OFFICE 2,270,561

METHOD OF AND APPARATUS FOR MAKING DENTURES

William E. Sanborn, Detroit, Mich.

Application October 3, 1938, Serial No. 233,045

2 Claims. (Cl. 32—32)

This invention relates, in general, to dentistry and, in particular, to a new and improved method of and apparatus for making dentures.

One of the main objects of this invention is to provide a new and improved method of and apparatus for making upper and lower dentures so that both the upper denture and the lower denture can be made substantially concurrently with equal facility, intelligence and accuracy, and so that said dentures will fit comfortably in the mouth and be properly occluded one to the other in perfect articulation to permit the patient to continue habitual movements of mastication.

Another object is to provide a new and improved method of and apparatus for making upper and lower dentures during the carrying out of which method and operation of which apparatus the teeth for the lower denture are set up to a positive surface representative of the true occlusal surface of the patient's missing natural upper teeth, and then setting up the teeth for the upper denture to the established teeth on the lower denture, thereby eliminating all guesswork and simplifying the heretofore inaccurate and hit-and-miss procedure of making an upper and a lower denture to one of making a single denture though two mating dentures are made.

Another object is to provide a new and improved method of and apparatus for making upper and lower dentures during the performance of which method and operation of which apparatus a reference plane representative of the median plane through the patient's most natural bite is fixedly positioned and maintained away from the patient's mouth and which plane serves as a reference plane for each step and operation in the making of properly fitting and articulated dentures, thereby permitting the dentist to see what he is doing when he is doing it and to permit him to be interrupted at any stage or step of the denture construction and to return always to that plane to continue his operations to completion.

Another object is to provide a new and improved method of and apparatus for making upper and lower dentures during the performance of which method and operation of which apparatus the bite may be corrected without disturbing the originally established relative positions of the work-carrying elements or their relation to the aforementioned plane, and also during which performance and operation any existing interferences between the cuspal surfaces of the upper and lower teeth may be readily and intelligently removed without the heretofore trial and error method, thereby providing the patient with faultlessly-made dentures, dentures which fit the patient both anatomically and to his individual appearance.

Another object of the invention is to provide a new and improved dental apparatus for making dentures which permits the denture for either mandible to be made as accurately and easily as the other denture and, which is even more important and valuable to the dental art, which permits both dentures to be made as easily and accurately as a single denture without guess-work and reliance upon the human element of error, the dentist or operator having full control of every operation of the apparatus from the taking of the first impression to the final completion of the dentures.

Another object is to provide a new and improved dental apparatus for making dentures which permits the positioning therein of the models made from the patient's own and most natural bite with a selected relationship therebetween to substantially the median plane through said bite, and retaining this reference plane and these models in their selected relationship thereto during the making of the dentures whether or not it is found necessary in the interim to change the bite, thereby eliminating the mystery in denture-making and providing dentures which are properly individualistic and not the products of guess-work.

Another object is to provide a new and improved dental apparatus for making dentures in which the work-carrying elements are positioned and maintained in selected relationship to the median plane through the patient's most natural bite which has been established in the apparatus, and which apparatus permits the setting of the teeth onto the supported lower denture not only to said plane but to the proper occlusion, and which then permits the teeth for the supported upper denture to be set thereupon with the established occlusion of the lower teeth as a guide therefor, thereby producing a pair of dentures in which the bite and the occlusion are those of the patient and, therefore, properly adapted for him.

Another object is to provide a new and improved dental apparatus for making dentures in which the upper and lower work-carrying members are relatively and lineally movable toward and from each other for establishing the proper relationship therebetween and to the planar surface of a third member, the surface of the latter being maintained at a selected level representative of the median plane through the patient's most natural bite and being employed as a standard to which the lower teeth are set, the upper teeth then being set to the standard now inherent in the lower teeth.

Another object is to provide a new and improved articulator which carries the median plane through the patient's most natural bite and permits all operations to be based thereupon and to be related thereto so that a true and natural bite will be insured to the finished dentures, which permits the ready and intelligent removal of any and all interferences from the cuspal surfaces of the dentures which would otherwise prevent habitual articulation and mastication, which permits the opening or closing of the bite without disturbing the setting of the articulator, which permits the occlusal surface of the lower teeth to be balanced with a surface simulatory to the patient's natural upper occlusal surface, and which permits the upper teeth to be established with an occlusion balanced with the lower teeth.

Another object of the invention is to provide a new and improved method of and apparatus for making a new base for a patient and resetting the teeth of the patient's old denture thereon which enables the patient to have a new, comfortable and properly-fitting denture the teeth of which at the same time are positioned and related exactly as they were in the patient's old denture.

Another object of the invention is to provide a new and improved method of and apparatus for making a new base for a patient and resetting the teeth of the patient's old denture thereon so that the new denture can be made readily and inexpensively and to fit accurately and comfortably in the patient's mouth without changing the patient's habitual occlusion.

Another object of the invention is to provide a new and improved method of and apparatus for making a new base for a patient and resetting the teeth of the patient's old denture thereon which correctively takes into account any shrinkage in the ridge which has taken place since the old denture was provided and which gives to the new denture a perfect fit between it and the supporting portions of the mouth and to the teeth thereon their original appearance and relativity.

Another object is to provide a new and improved apparatus for employment in the remaking of a new denture for a patient and the setting of the teeth from the patient's old denture thereon in their original relationship to each other whereby the new denture will fit the patient's mouth comfortably and properly and yet retain its original outward appearance and the occlusion to which the patient has become accustomed.

Other objects and advantages of the invention will become readily apparent from a reference to the following specification taken in conjunction with the accompanying drawings, of which there are eight (8) sheets, and wherein.

In Figs. 1 through 5, 9 through 12, 15, 20, 21, 26 through 34, 41, 43, 44, and 46 through 49, there is shown the improved and novel apparatus, or details thereof, for establishing the proper planes and positions of and relationship between the upper and lower teeth of dentures which insures to the patient the continuation of habitual movements of mastication and natural articulation. This apparatus or machine is generally indicated at 10 and is, in general, an articulator but, in particular, an articulator which is specially designed for performing in a novel and accurate manner each of the various functions necessary for obtaining the desired results.

Articulator 10 comprises a supporting base 12 (see Figs. 1 and 2) having a boss 14 integral therewith and extending upwardly from its top surface. Boss 14 is provided with a semi-spherical socket 16 into which is mounted, for universal movement, a ball member 18 which has an integral flattened head 20 rigidly and substantially secured to the under-surface of a flat table 22. Base 12, boss 14 and ball member 18 are all properly bored to receive a pin 24 one end of which is rigidly secured to or made integral with the under-surface of the table 22 and the other end of which is threaded for receiving a wing nut 26, the bored portions of said base and said ball member being such as to permit universal movement of said table relative to said base, and said wing nut being operable for being tightened against said base when the desired relative positions of said table and base have been selected for maintaining said positions. A pair of ordinary leveling means 28 is provided for the table 22 and fixed thereon in proper positions for indicating when an absolutely level position for the upper surface of the table 22 has been attained. This detailed description of the parts rendering universal movement of the table 22 with respect to the supporting base 12 is for the purpose of illustration only, the spirit of the invention contemplating any arrangement which will permit this movement and enable the table to assume and maintain a perfectly horizontal position.

Referring particularly to Figs. 1 through 5, an upright standard 30 is rigidly secured to the upper surface of table 22 by means of bolts or rivets 31 which pass through base flanges formed integrally on said standard into or through said table, standard 30 being disposed rearwardly of the vertical axis of universal movement of said table and extending laterally across the upper surface of the latter. Standard 30 extends for a substantial distance upwardly from said table, its two rear side edges 32 being machined at substantially 45° angles and absolutely perpendicular to the flat upper surface of table 22. Standard 30 is rearwardly flanged at its top portion, as at 34, said flange being provided with a vertical bore therethrough equidistant from the two angled edges 32 of said standard. In mortised engagement with the angled edges 32 of the standard 30 is a pair of vertical arms 36, arms 36 being spaced for said engagement by means of an integral horizontal platform 37 (see Figs. 1, 2 and 3) extending between said arms at the rear thereof and being integral therewith. To each vertical arm 36 and to the side of platform 37 thereadjacent is rigidly secured a forwardly extending horizontal guide arm 38, the two guide arms 38 being parallel and spaced from each other and each having a flat upper surface therealong lying in a common plane which is parallel with the plane of the upper surface of the table 22. Therefore, due to the mortised engagement between the vertical angled edges 32 of the standard 30 and the rigidly spaced vertical arms 36, to which the horizontal arms 38 are rigidly fixed, arms 36 and 38 are operable for guided, vertical movement in unison with respect to said standard 30 for altering the spacing between the horizontal and parallel planes occupied by the upper surfaces of the table 22 and horizontal arms 38. For readily adjusting and maintaining an adjusted position of the upper planar surface of arms 38 with respect to the upper planar surface of table 22 there is provided a finger bolt 40 which is journaled in the bore in the top flange 34 of standard 30 and in threaded engagement with a vertically aligned threaded opening in the rear platform 37 between the vertical arms 36, so that turning of said bolt in either direction simultaneously raises or lowers, as the case may be, the arms 36, the platform 37 and the arms 38 relatively to the table 22 and standard 30. The forward face of one of the vertically movable vertical arms 36 is provided with a vertical scale 41 (see Figs. 3, 26 and 28), the side face of one of the vertically movable horizontal arms 38 is provided with a horizontal scale 42 (see Fig. 1), and the forward face of standard 30 is provided with a stationary pointer 43 immediately adjacent the scale 41 (see Figs. 1, 4, 5, 26, 27 and 28).

Slightly above the plane of the upper limit of movement of the two horizontal arms 38, and forwardly of the two vertical arms 36, standard 30 is horizontally bored at opposite sides thereof, such as at 44, the axes of the two bores 44 being coaxial and in parallelism with the planar surfaces of the table 22 and arms 38. Bores 44 receive a tight-fitting pin 46 which is readily removable therefrom, and the diameters of the bores and pin, together with the bearing surfaces therebetween, are such that little or no wear occurs thereat.

Mounted to the pin 46 for pivotal movement about the horizontal axis thereof is a casting, generally indicated at 48, casting 48 representing the lower half of the articulator because it is this casting which is to carry the plates, models, impressions, etc., of the lower mandible or maxilla. Casting 48 comprises a forwardly extending base portion 49, a pair of horizontally spaced, upstanding supporting arms 50 at the rear of said base portion and each provided at its upper end with a bored lug 51, said lugs being engageable with the pin 46 between and adjacent the two side portions of standard 30 for pivotally supporting the casting 48 thereby, an upstanding lug 52 on said base portion slightly forwardly of each supporting arm 50 and bored transversely therethrough, a vertical threaded opening 53 in said base portion equidistant from and slightly behind the lugs 52, a boss 54 formed on said base portion slightly ahead of opening 53 and operable for having mounted thereon the rear end of a forwardly extending plate spring 55, and a concave depression 56 in the upper surface of said base portion the contour or curvature of which will be explained later.

It will be noted that casting 48 has one and only one movement with respect to stationary standard 30, that movement being a pivotal movement about the horizontal axis of the removable pin 46. Therefore, in order to reproduce in the lower half of the articulator 10 a close simulation to the lower mandibular movement, a casting 58 is provided in conjunction with casting 48, same being separable therefrom and operable for movement relatively thereto. Casting 58 comprises a bifurcated rear portion the bifurcations of which comprising pins 59 which are engageable with the transverse bores in the lugs 52 on the casting 48, a convex undersurface 60 complementary with the concave upper surface 56 of the casting 48, a downwardly tapered opening 61 in the body thereof, and a laterally extending opening in the body thereof centrally of the opening 61 and in which is received a removable pin 62. The pins 59 which engage the bores in the lugs 52 do so engage same very loosely so that the movement which casting 58 is capable of with respect to casting 48 approaches a universal movement, the spring 55 mounted on casting 48 engaging the upper surface of casting 58, opposing said movement, and constraining the convex surface 60 of casting 58 into close engagement with the concave surface 56 of casting 48. The concavity of surface 56 of casting 48 and the complementary convexity of surface 60 of casting 58 are predetermined by the employment of known methods and are cooperable for permitting the casting 58 to be moved and guided over the casting 48 with a complex swinging movement as closely resembling the natural mandibular movement as said known methods are capable of reproducing. Normally, however, casting 58 is held immobile by its own weight, by the pressure of spring 55, and by friction between the engaging surfaces 56 and 60.

For holding the assemblage of castings 48 and 58 in any desired position, when same has been mounted for pivotal movement about the pin 46, there is provided an adjustable support comprising a bolt 64 in threaded engagement with a base member 65, the upper end of the bolt 64 adjusting the elevation and preventing downward movement of the castings, and the base member 65 merely resting on the upper surface of table 22 and being laterally movable therealong.

The rear face of each of the vertical arms 50 of the pivoted casting 48, just forwardly of the axis of the pin 46, is formed with a vertically extending laterally directed V-cut 66 between which V-cuts is supported, in mortised engagement therewith, the angled side edges of a casting 67. Casting 67 is formed at its upper surface with a pair of spaced lugs 68 each of which has a bore in alignment with each other and in parallelism with the axis of pin 46. Integral with the forward face of casting 67 is formed a boss 69 having a vertical bore 70 formed therethrough, bore 70 being in vertical alignment with the threaded bore 53 in the base portion 49 of casting 48. A finger bolt 71 is rotatably received in the bore 70 and is adjustably threaded into the bore 53 for raising or lowering the casting 67 along the V-cuts 66 with respect to the castings 48 and 58. In other words, the only movement that casting 67 has with respect to castings 48 and 58 is a movement perpendicularly thereto. The upper surface of boss 69, forwardly of the bore 70, has anchored thereto the lower end of an upstanding plate spring 72. By any well known means, such as a horizontal annular slot (not shown) around that portion of the surface of bolt 71 which is enclosed by the boss 69, and a set screw (not shown) in said boss and in engagement with said slot, relative vertical movement between casting 67 and bolt 71 is prevented when said bolt is turned in either direction for raising or lowering the casting 67 relatively to castings 48 and 58.

The upper half of the articulator 10, so-called because same is operable for carrying the plates, models, impressions, etc., of the upper mandible, is a casting represented generally at 74. Casting 74 comprises a flat plate member which is bifurcated at its rear, the bifurcations being formed as spaced lugs 75 and said lugs being coaxially bored, the spacing therebetween permitting lateral contact between said lugs and lugs 68 on casting 67. A removable pin 76 is inserted through the aligned bores in lugs 68 and 75 and operates as a pivot for casting 74 with respect to casting 67. The body of casting 74 is provided with a vertical, upwardly tapered opening 77 therethrough, there also being a lateral, horizontal opening through said casting centrally of opening 77 and in which is received a pin 78. Between the lugs 75 and opening 77 casting 74 is provided with a vertical threaded opening in which is received an adjustable set screw 79 the lower end of which is cooperable with the upper surface of boss 69 on casting 67 for limiting the downward pivotal movement of casting 74 about pin 76 and maintaining any selected spacing between the castings 48—58 and 74. A lock nut 80 is provided on the set screw 79 adjacent the lower surface of casting 74. It will be noted that the spring 72 which is mounted on the boss 69 of casting 67 extends between the bifurcations of casting 74 to a level slightly thereabove, so that, when casting 74 is pivotally raised about the pin 76 to its uppermost position, the upper end of said spring serves as a stop against lowering of the casting 74 about its pivot. When such lowering of casting 74 is desired, however, spring 72 can readily be impressed rearwardly so as to clear the casting 74.

Figure 29:
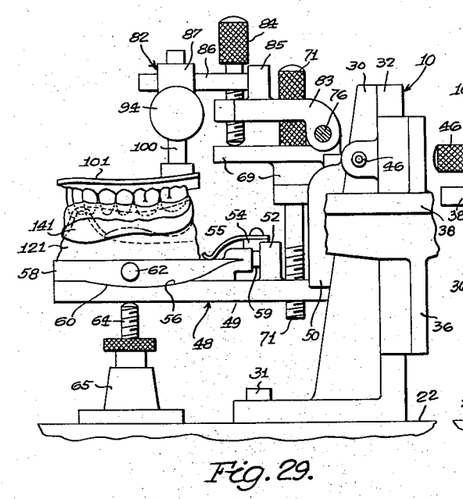
Fig. 29 is a view, in elevation, similar to Fig. 27, but showing the pins as having been removed and also showing the operation of setting the lower teeth in the base plate to and in accordance with the working surface of the template.
Figure 30:
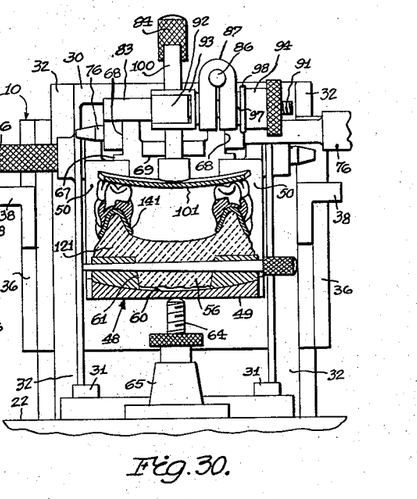
Fig. 30 is a front elevational view of the showing in Fig. 29.
Figures 31, 34:
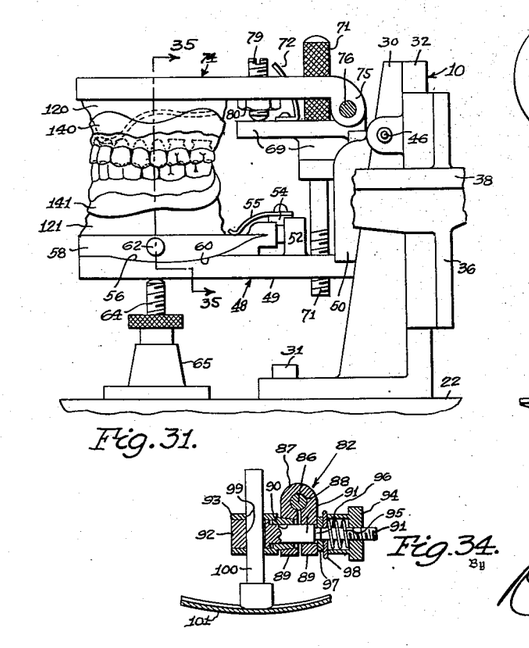
Fig. 31 is a side elevational view of the novel and improved articulator with the lower denture of Figs. 29 and 30 in place therein, and showing the step of setting to the lower teeth of said denture the upper teeth in the upper base plate.
Figure 32:
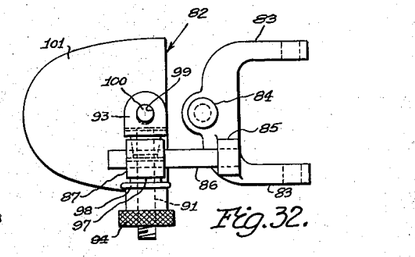
Figs. 32 and 33 are plan and side elevational views, respectively, of the template device employed in Figs. 27 through 30.
Figure 33:
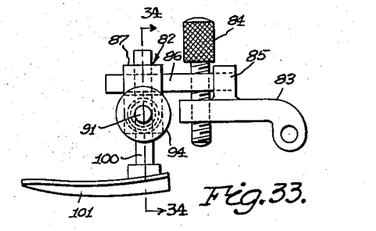

Now referring particularly to Figs. 27 through 30, it will be noted that the apparatus shown therein is similar to the apparatus already described, except that the upper half of the articulator, or, the casting 74, is replaced by a template, generally indicated at 82 and shown in detail in Figs. 32 through 34. Template 82 comprises a rearwardly directed, bifurcated member 83 the bifurcations of which are coaxially bored and spaced similarly to the spacing of the lugs 75 of casting 74 for permitting member 83 of the template to be pivotally supported by the pin 76 in place of the casting 74, a vertical threaded opening forwardly of the bifurcations and in which opening is adjustably engaged a set screw 84 the lower end of which cooperates with the upper surface of the boss 69 on casting 67 to limit the downward pivoted movement of the member 83 of the template about the pin 76, and an upstanding boss 85 laterally of the set screw 84. Integral with or secured against rotation to the boss 85 on member 83, and extending in a horizontal direction forwardly therefrom, is a short rod 86 the forward end of which receives a bifurcated clamp 87. Clamp 87 at its upper end is provided with a transverse bore 88 by which said clamp is supported by said rod, and the lower end of said clamp, laterally through its bifurcations 89, is provided with a bore 90 in which is received a shaft 91. One end of shaft 91 is formed with a head 92 about which is disposed a sleeve 93 having a tapered inner end cooperable with an enlarged tapered section of bore 90 (see Fig. 34). The other end of shaft 91 is threaded for receiving a hollow nut 94 in which is disposed a spring 95. Intermediate its ends shaft 91 is formed with a longitudinal key section 96 over which is disposed a key washer 97, there being provided a standard washer 98 on said shaft between washer 97 and the inner end of nut 94. Head 92 and sleeve 93 are radially bored, as at 99, for slidably receiving, when aligned, the upper end of a rod 100 to the lower end of which is fixedly secured the plate 101 of the template 82, the under or working surface of the plate 101 being predeterminately shaped in the usual manner to represent, as does the combined effect of the surfaces 56 and 60 on castings 48 and 58, the closest possible simulation to the occlusal plane. The convexity of the working surface of plate 101 is identical with the convexity of the surface 60 of casting 58. It will be readily appreciated that the plate 101 is movable with universal movement because of the combination of the movements which comprises, movement about the lateral horizontal axis of the pin 46, movement about and along the axis of transverse rod 86, movement about the lateral horizontal axis of shaft 91, and movement about the vertical axis of rod 100. It will be appreciated also that tightening the nut 94 on the shaft 91 not only binds against free movement the clamp 87 about and along the rod 86, but also binds against free axial and rotative movement the rod 100 relatively to the head 92 of the shaft 91 and the sleeve 93 thereon. This detailed description of the template 82 which can move universally, transversely and vertically, and which can always be restored to an originally selected position, is for the purpose of illustration only, the invention contemplating any other template having a proper working surface which permits said surface to move universally, transversely and vertically with respect to a horizontal plane thereunder.

Figure 7:
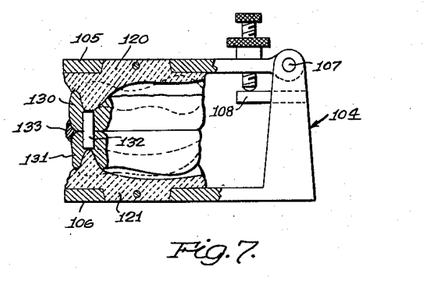
Fig. 7 is a view showing the step of reproducing the bite taken in Fig. 6 into the ordinary articulator.
Figure 8:
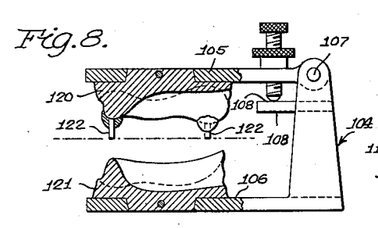
Fig. 8 is a view similar to Fig. 7 but showing the base plates removed and the determination of the median plane through the bite.
Figures 9, 14:
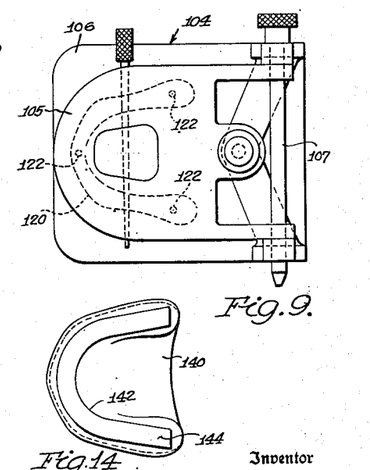
Fig. 9 is a plan view of the showing in Fig. 8.
Fig. 14 is a bottom plan view of the new upper base plate and its bite rim shown in Figs. 12 and 13.

Employed in an early phase of the novel and improved method of making dentures to be hereinafter described, and shown in Figs. 7, 8 and 9, is an articulator, generally indicated at 104, said articulator being of any ordinary and well known construction and comprising, as usual, upper and lower halves 105 and 106, respectively, mounted in the usual manner for relative pivotal movement by means of the usual pin 107 and being limited in said pivotal movement by the usual stop arrangement 108.

Figures 26, 35:
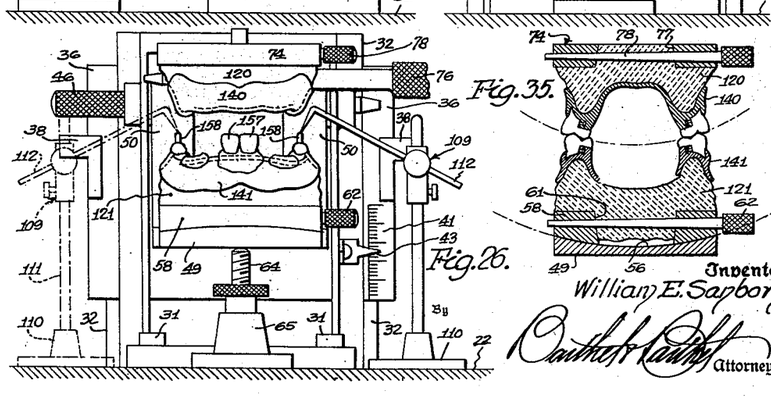
Fig. 26 is a front elevation of the new and improved articulator with the lower base plate of Figs. 24 and 25 in place therein, and showing the step of positioning pins in the heel of said plate at the desired level for providing a multi-point contact for subsequent use.
Figs. 34 and 35 are sections taken along the lines 34—34 and 35—35, respectively, in Figs. 33 and 31, respectively.

Employed in a later phase of the method, and shown in Fig. 26, is an ordinary surface gauge, generally indicated at 109, said gauge comprising the usual supporting base 110 freely mounted on the upper horizontal surface of the table 22 of the articulator 10 and readily movable therealong, the usual standard 111 mounted in said base and extending vertically upwardly therefrom, and the usual pointed arm 112 mounted for its customary movements in the ordinary manner relatively to said standard. Gauge 109 has been selected purely for the purpose of illustration, but it is to be understood that the employment of any other known and suitable means which is adapted for carrying out the function of said gauge is contemplated, said function to be subsequently described.

In various figures in the group consisting of Figs. 1 through 35 there is shown a flat plate 114 having a pair of parallel, spaced, transverse ribs 115 on its undersurface, the spacing between said ribs being the same as the spacing between the inner faces of the horizontal arms 38 so that said plate can rest in a horizontal position upon said arms and be prevented from lateral movement with respect thereto by means of the interengagement between said arms and said ribs. Plate 114 is also provided at the front and on the undersurface thereof with lateral ribs 116 which are cooperable with the forward faces of arms 38, when plate 114 is in its rearwardmost position, to provide a stop for said plate thereat. Plate 114 may or may not be provided on its upper surface with laterally extending depressions (not shown) in alignment with the indications on the horizontal scale 42 for guiding the operator during the method and enabling him to position the denture on the plate 114 in the originally selected place thereon after each time it has been removed therefrom.

In various figures in the group consisting of Figs. 36 through 49 there is shown, instead of the plate 114, another flat plate 118 similar to plate 114 in that same has the ribs 115 and 116 which are cooperable with the arms 38 but differing therefrom in that it has on its upper surface and substantially centrally thereof a beveled lug 119, the purpose of which lug will be subsequently explained.

The steps to be taken and the order thereof in the new and improved method of making dentures are as follows:

By the use of standard practice and materials upper and lower impressions are taken of the patient's mouth (this step being standard and, therefore, not shown), and from these impressions upper and lower models are made in the ordinary manner, and of the usual plaster or cement material (this step also not being shown). The upper model will be designated henceforth as 120 and the lower model as 121.

Figure 1:
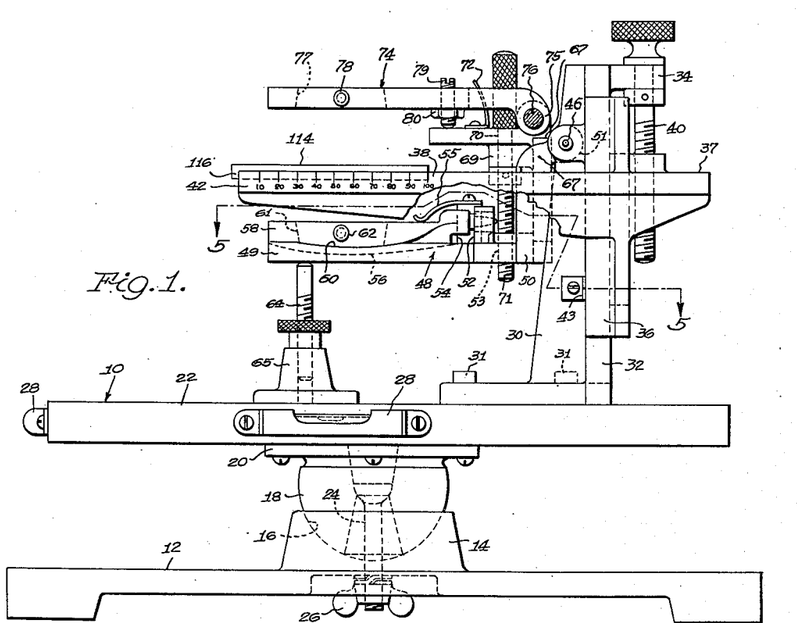
Figure 1 is a side elevational view of the new and improved apparatus in assembly.
Figure 2:
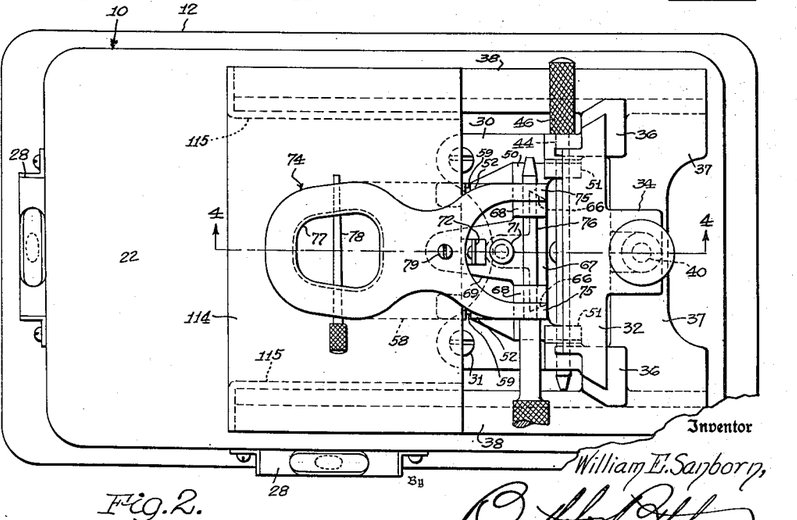
Fig. 2 is a plan view of the showing in Fig. 1.
Figures 3, 5:
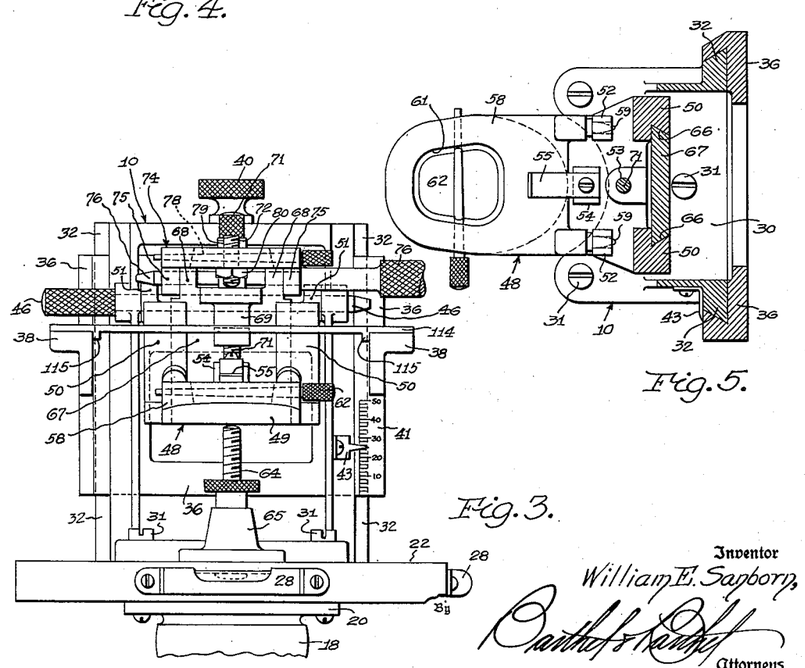
Fig. 3 is a front elevational view of the apparatus shown in Figs. 1 and 2.
Figs. 4 and 5 are sectional views taken, respectively, along the lines 4—4 and 5—5 in Figs. 2 and 1, respectively.
Figure 4:
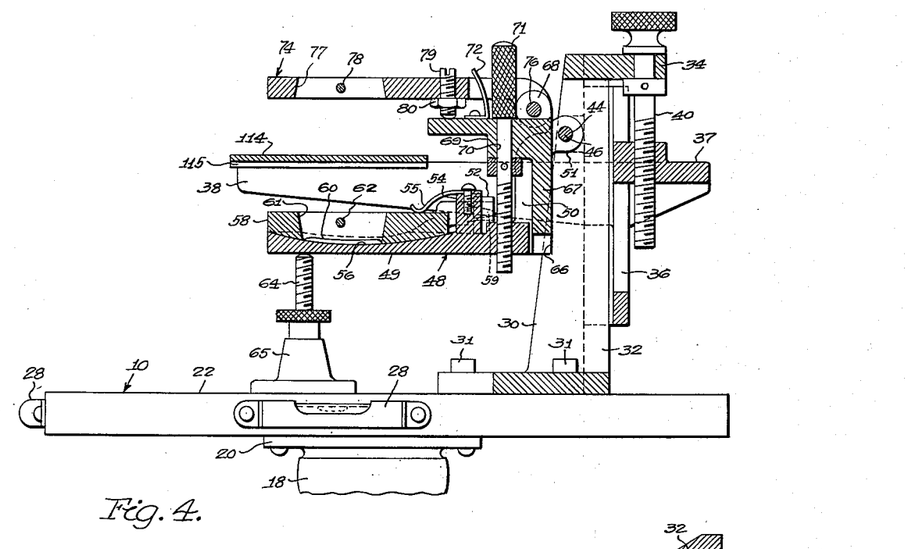
Figure 6:
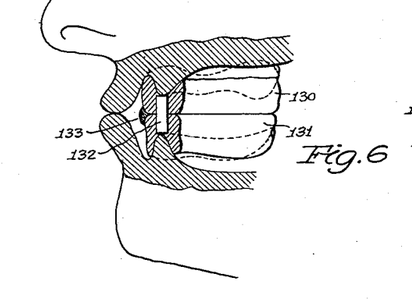
Fig. 6 is a view showing the step of taking the bite from the patient's mouth.

The step of taking the bite is shown in Fig. 6 and comprises the formation, in the ordinary manner and out of the ordinary material, of upper and lower base plates 130 and 131, respectively, said base plates being inserted in the patient's mouth and having a vertical peg or stop 132 positioned therebetween at the front or anterior thereof and a quantity of modeling material 133 at their ridges. The length of the peg or stop 132 is that which approximates the vertical opening and permits the facial expressions of the patient, when the mouth is closed in the normal position, to be as natural as possible. With the base plates in position the patient is instructed to close the mouth to its normally closed position and in which position the upper maxilla and lower mandible strike the stop 132. The modeling material 133 at the same time arranges itself between the base plates and serves as a temporary binder therebetween which is readily removable therefrom and which later serves as a form for re-positioning the base plates into the relative positions they assumed while in the mouth and as shown in Fig. 6.

When the bite has been taken, as shown in Fig. 6, the base plate assembly is removed from the mouth, either as a unit, if possible, or in parts, the parts being readily re-assembled thereafter because of the nature of the compressed and formed modeling material 133 and the peg 132 and the singular relationship thereto of the plates 130 and 131. Upon removal from the mouth and reassembly of the plates 130 and 131, the stop 132 and the material 133, said parts are joined together at the meeting ridges of the plates to insure same against accidental separation or relative displacement. The models 120 and 121 are then introduced to the plates 130 and 131, respectively, and the entire unit is then placed in the articulator 104, as shown in Fig. 7, plaster being employed for building up the models, in their proper fitting engagement with the base plates, into their proper positions with respect to the articulator.

The base plate assembly, or bite, is then removed as a unit from the models 120 and 121, said models remaining in the articulator 104, and to the anterior and heel portions of the upper model 120 are temporarily stuck three pins 122, as shown in Figs. 8 and 9, the lengths of said pins being such as to permit the lower ends thereof to lie in a common horizontal plane substantially mid-way between the opposing ridges of the two models. This plane, it is clear, represents the median plane through the originally established bite, the single anterior pin 122 and the two heel pins 122 terminating at this plane in a three-point contact.

Figure 10:
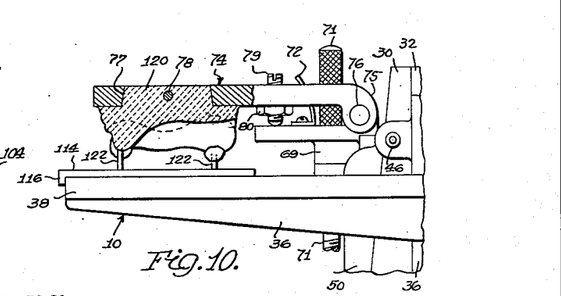
Fig. 10 is a side view of the upper portion of the new and improved articulator with the model of Fig. 8 placed therein, and showing the step of reproducing in said articulator the median plane established in Fig. 8.

As shown in Fig. 10, the upper model 120 with the pins 122 positioned thereon, as described, has been removed from the articulator 104 and set in three-point contact upon the plate 114 resting in horizontal position upon the arms 38 of the articulator 10 and arranged directly below the opening 77 in casting 74. The set screw 79 has been adjusted so that cooperation thereof with boss 69 on casting 67 permits the planes of casting 74 and plate 114 to be parallel. Then, the finger bolts 40 and 71 are manipulated so as to bring the model 120 and casting 74 as closely together as desired, after which plaster is added between said model and casting for securing same together, the pin 78 being employed for the purpose of permitting the model 120, when later removed from the casting 74, to be re-inserted in the same position in the opening 77 subsequently thereto. The result of these steps taken in the representation of Fig. 10 is the reproduction in the articulator 10, and as characterized by the planar surface of plate 114 thereof, the median plane established in Fig. 8 and representing that horizontal plane which is median to the bite taken from the patient's own mouth and natural reactions in Fig. 6. The relative vertical and horizontal positions of the plate 114 and the lower limit of movement of the upper half or casting 74 of the articulator 10 are now made permanent by locking the adjustments employed in obtaining said positions in their present positions.

Figure 11:
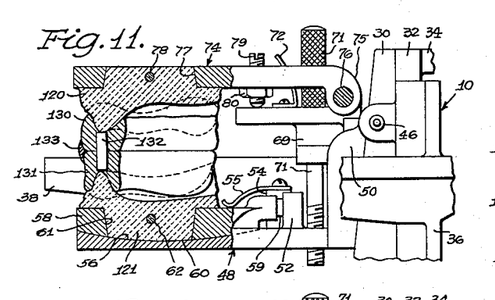
Fig. 11 is a side view of the new and improved articulator with the built-up model of Fig. 10 and the lower model of Fig. 8 in place therein, the bite taken in Fig. 6 being shown in place over said models, said figure representing the step of properly building up said lower model in said articulator with respect to said bite.

Following the steps taken in Fig. 10 the plate 114 is removed from the articulator 10 and the pins 122 are removed from the model 120, said model remaining in the articulator. The bite or base plates 130 and 131 are now introduced, as a unit, to the articulator 10, the plate 130 being properly fitted over the model 120, and the model 121 being removed from the articulator 104 and properly fitted into the plate 131. With the models and base plates so inter-related the articulator 10 is closed, the model 121 naturally being lowered into proximity with the lower half 49—58 of the articulator, and at which lowermost position of the articulator the model 121 is secured, by plaster, into the opening 61 of the casting 58. This is shown in Fig. 11 and is a pure reproduction into the articulator 10 of the bite and position of the mandibles in Fig. 6.

Figures 12, 13:
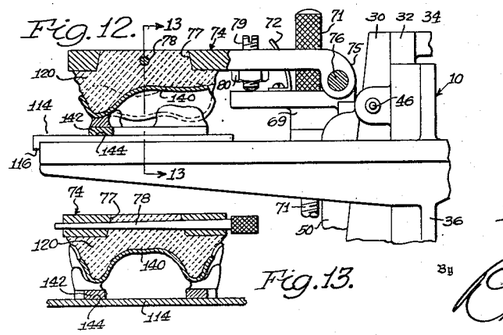
Fig. 12 is a side view of the upper portion of the new and improved articulator with the upper model and a new upper base plate in place therein, and showing the step of positioning the bite rim of the latter.
Fig. 13 is a sectional view along the lines 13—13 in Fig. 12.

The bite or joined plates 130 and 131 are now removed from the articulator 10, the built-up upper model 120 remaining therein. In the ordinary manner and with the ordinary material another upper base plate 140 is made from and stuck in proper position to the model 120 while the upper half 74 of the articulator 10 is in opened position. A bite rim 142 of proper and well-known material and having a flat lower surface 144 is made for the base plate 140 and is placed on the plate 114 with the flat surface 144 in contact therewith, the articulator 10 is then closed to its predetermined lowermost position, and the bite rim 142 is now stuck temporarily to and about the ridge of the lowered base plate 140 while keeping said articulator closed and the surface 144 in flat contact with plate 114. This is shown in Figs. 12 and 13 and the result thereof is the reproduction of the median plane through the bite, established earlier, on the upper base plate 140—142 and as characterized or represented by the surface 144 thereof when the articulator 10 is closed.

The plate 114 is then removed from the articulator 10, the base plate and bite rim 140—142—144 remaining in place therein in proper fitting engagement with model 120. While the articulator 10 is opened, a new lower base plate 141 is made from and stuck in proper position to the lower model 121 therein in the ordinary manner and with the ordinary material. A bite rim 143 of proper material and having a flat upper surface 145 is then made for the base plate 141. The upper half 74 of the articulator 10, which is supporting in proper and predetermined positions the built-up model 120, the base plate 140 and the bite rim 142—144, is then lowered to its lowermost position and the bite rim 143—145 is arranged and built up on the same plate 141 so that its surface 145 is in full and flush contact with the surface 144 of the bite rim 142—144 of the base plate 140, after which determination the bite rim 143—145 is temporarily stuck to the base plate 141. This is shown in Figs. 15 and 16, and the result is that, when the articulator, which is carrying the models 120 and 121 and the base plates 140—142—144 and 141—143—145, is closed, the surfaces 144 and 145 lie in a common plane which is representative of the previously established median plane through the bite.

The steps so far taken and described had their starting point based upon the bite which was taken from the patient's mouth, as shown in Fig. 6. Therefore, this bite should be checked before proceeding with the method. The first step in checking the bite is to remove the plates 140—142—144 and 141—143—145 from the articulator 10 and place them individually in the patient's mouth, whereafter the patient is instructed to close the mouth. If the facial expression of the patient is natural when the mouth is closed, obviously no alterations, or rearticulation, in the bite are necessary. However, the check usually reveals that the bite should be corrected vertically, that is, it should be closed or opened, or that it should be corrected laterally or transversely, or that it should be corrected both vertically and horizontally. For the purpose of illustration the steps taken for opening the bite are shown, it being believed that the dentist will be able, from such illustration and discussion thereof, to correct the bite for faults other than the one shown and described.

Figure 15:
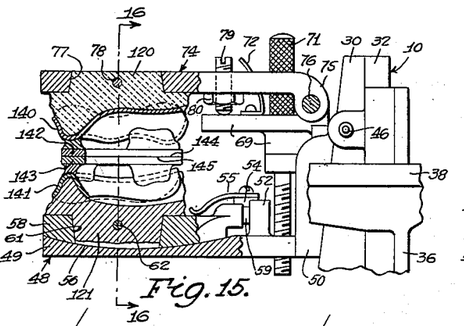
Fig. 15 is a side view of the new and improved articulator with the upper and lower models and new base plates in place therein, and showing the step of positioning the bite rim of the lower base plate up against the bite rim of the upper base plate.
Figure 16:
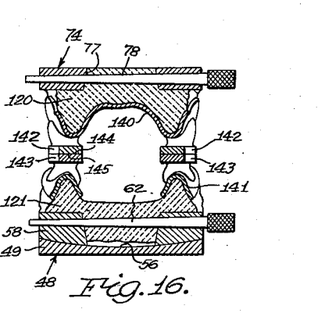
Fig. 16 is a sectional view taken along the lines 16—16 in Fig. 15.
Figure 17:
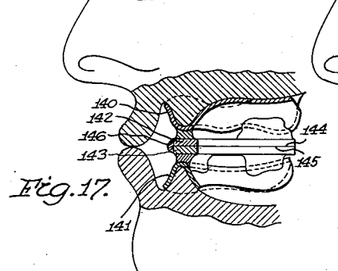
Fig. 17 is a side view showing the models, base plates and bite rims of Figs. 15 and 16 in place in the patient's mouth and showing no need for bite correction or re-articulation.

Fig. 17 shows the base plates 140—142—144 and 141—143—145 as having been removed from the articulator 10 in Figs. 15 and 16 and placed in the patient's mouth, the patient then having closed the mouth and worked the maxilla to a position whereat the dentist is satisfied with the naturalness of the resulting experssion. This figure shows the occasion of finding the bite, upon the check thereof, to be the same as that which was originally taken in Fig. 6. Upon this finding the dentist employs quantities of the usual modeling compound 146 and sticks same in a plurality of places to and around the abutment of the surfaces 144 and 145 to retain same in their present relationship.

Figures 18, 19:
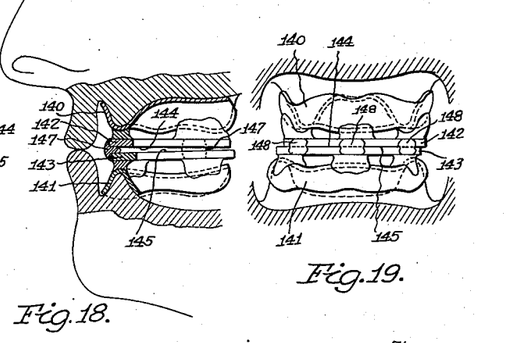
Fig. 18 is a view similar to Fig. 17 but showing the necessity, upon checking the bite, for opening same.
Fig. 19 is a front view of the patient's mouth and showing the necessity, upon checking the bite, for correcting same laterally.

Fig. 18, on the other hand, shows the need for opening the bite and, therefore, necessitating rearticulation of the bite rims. This finding is not as rare as the finding in Fig. 17 and is, as a matter of fact, expected because of the human elements involved, both in the patient and in the dentist. Nevertheless, when the dentist has found the expression on the patient's face to be natural, after the patient has closed the mouth and brought the mandibles at rest in a satisfactorily natural and habitual position, modeling compound 147, similar to compound 146, is stuck between the bite rim surfaces 144 and 145 in a plurality of places to open the bite to its newly-found height and retain the plates 140—142—144 and 141—143—145 in their new relative positions.

As has been said before, instead of the perfect condition found in Fig. 17 upon checking the bite, or instead of the necessity for opening the bite as found in Fig. 18, the condition shown in Fig. 19 may be found to exist, that is, it may be found necessary to correct the bite laterally. In this event, modeling compound 148, similar to compounds 146 or 147, is stuck in a plurality of places along the outer abutting edge of the surfaces 144 and 145 to retain the base plates 140—142—144 and 141—143—145 in their newly found relative positions.

Figure 20:
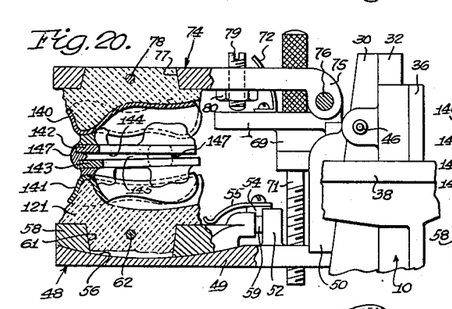
Fig. 20 is a view showing the newly-joined base plates of Fig. 18 in place in the novel articulator and showing the initial phase of re-articulating the plates to the newly acquired bite in Fig. 18.

Assuming the check reveals the necessity for opening the bite, as shown in Fig. 18, and assuming the plates 140—142—144 and 141—143—145 have been set to the new bite established in the patient's mouth by the heretofore described employment of the modeling compound 147 shown therein, the newly-joined plates are removed as a unit from the patient's mouth, the lower model 121 is removed from the casting 58, and the plate assembly is then placed into the articulator 10 by fitting in a proper manner the plate 140—142—144 over the model 120. The articulator 10 is then closed to its originally established lowermost position, the bite rim surface 144 naturally assuming a horizontal position, the model 121 is cut down or re-sized at the surfaces thereof which contact the surfaces of the casting 58 and opening 61 therein so that, when said model is fitted into proper position in the lower base plate 141—143—145, the model can occupy the necessary lower and tilted position thereof (to accommodate the increased vertical opening and as distinguished from the position of the lower model in Fig. 15), and said model is then re-cemented or re-plastered to the casting 58 into the opening 61 therein. This is the initial phase of re-articulation and is shown in Fig. 20.

Figure 21:
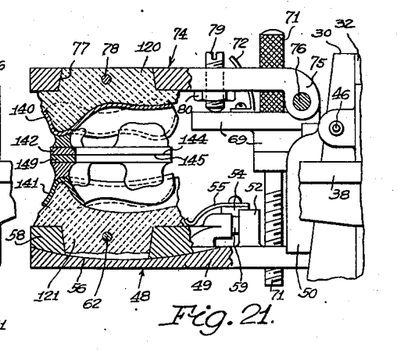
Fig. 21 is a view similar to Fig. 20 but showing the final phase of re-articulation.

The final phase of re-articulation is shown in Fig. 21, wherein the lower bite rim 143—145 is removed from its base plate 141 and placed up against the surface 144 so that surfaces 144 and 145 are again in as full and flush engagement as they were in Fig. 15. While so positioned, the lower bite rim is then built on to the base plate 141, such as at 149. The common horizontal plane now occupied by the two bite rim surfaces 144 and 145 is identical with that plane occupied thereby in Fig. 15, and it will be noted that this feature has been attained while maintaining the upper and lower halves of the articulator 10 in their original relative positions.

The foregoing description of the re-articulation phases is applicable also where the bite is that which has been found in Fig. 19. Naturally, there will be no building up of the lower bite rim, such as at 149, nor any cutting down of the lower model, but it will still be necessary to remove said model from its support and said bite rim from its base plate and to re-position same in accordance with the required lateral adjustments. This would also be true if the bite were found necessary to be corrected transversely, that is, from posterior to anterior or vice versa, or if it were found necessary to change it both laterally and transversely. In any event, whether the bite is to be opened, whether it is to be corrected laterally or transversely, or whether the adjustment is to be a combination of any of the foregoing corrections, both the lower model and the lower bite rim must be removed from their foundations and re-positioned or re-articulated to the original plane of the surface 144 in Fig. 15 and in accordance with the new bite taken upon the checking of the bite in Fig. 15, the latter being the same bite as that taken in Fig. 6.

Before proceeding with the method, it is pointed out that checking the bite might reveal that the bite is to be closed, that is, the height of the vertical opening is to be lessened because the lips do not come together sufficiently, when the mouth is closed, to give a natural expression. If this is the case, the lower base plate and bite rim are left in the mouth and the upper base plate and bite rim are removed therefrom. The upper bite rim is then removed from its base plate and trimmed down along the surface thereof opposite its surface 144 to the point where, when the bite rim is re-positioned on its base plate and re-inserted in the mouth, the patient's facial expression will be natural when the mouth is again closed and the surfaces 144 and 145 brought into proper planar contact with each other. Thereupon, the base plates 140—142—144 and 141—143—145 are removed from the mouth and the latter plate is placed in its proper position over the lower model 121 in the articulator 10. The upper model 120 is removed from the casting 74, the upper plate 140—142—144 is placed in planar contact with the positioned lower plate, the free model 120 is placed properly into said upper plate, the articulator is closed, and the model 120 is then re-built into the opening 77 of the casting 74 while keeping the articulator closed, the upper model in its proper position with respect to the upper plate and the surfaces 144 and 145 in said planar contact.

Figure 22:
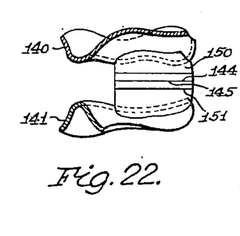
Fig. 22 is a side view of the assembled base plates and corrected bite rims and showing the anterior portion of each of the latter as having been removed from its respective plate.
Figure 23:
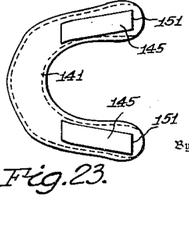
Fig. 23 is a plan view of the lower plate and bite rim shown in Fig. 22.

Now assuming that the bite has been found satisfactory or that it has been corrected upon the check thereof, the plates 140—142—144 and 141—143—145 are removed from the mouth or from the articulator 10, as the case may be, and the entire anterior portion of each of the bite rims 142—144 and 143—145 is removed, the portions of said upper and lower bite rims remaining being the posterior portions thereof represented at 150 and 151, respectively, as shown in Figs. 22 and 23. The forward extent of each of the portions 150 and 151 terminates at substantially that position which is soon to be occupied by the distal face of the cuspid for that section of the denture, said portions retaining their surfaces 144 and 145 along their lengths.

Figure 24:
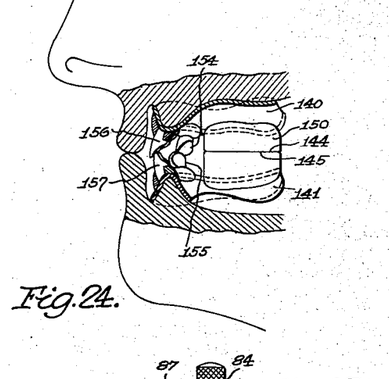
Fig. 24 is a side view of the patient's mouth with the plates of Fig. 22 therein, and showing the step of mounting the cuspids and anteriors thereon.

The plates 140—150—144 and 141—151—145 are placed back in the patient's mouth, and the patient is instructed to close the mandibles, the surfaces 144 and 145 of the bite rim portions 150 and 151 naturally coming together in planar contact. With the mandibles thus closed in their natural position the dentist, by employing his dental skill and knowledge, mounts upper and lower cuspids 154 and 155 and anteriors 156 and 157 to their respective plates and in their proper locations, as shown in Fig. 24, said cuspids and anteriors having been selected as those most appropriate for the present patient and the levels and positions at which they are set onto the plates being dependent upon the plane of the abutting surfaces 144 and 145 of the bite rim portions 150 and 151, said plane being the dentist's guide. The cuspids 154 and 155 serve as a guide for enabling the dentist to visualize that fullness of the mouth which is natural to the patient so that the anteriors 156 and 157 can be set in accordance therewith.

The plates 140—150—144 and 141—151—145 are now removed from the patient's mouth and the latter plate is properly placed on the model 121 in the articulator 10. The surface gauge 109 is then placed on the table 22 and the pointer 112 of said gauge is set and fixed at the level of the surface 145 of the lower bite rim portion 151. The lower cuspids 155 and the lower bite rim portions 151 are now removed from the lower base plate 141 and a pin 158 is mounted by wax or other means onto the heel or posterior of said plate at either side thereof, as shown in Fig. 26, and to the level of the pointer 112.

Figures 25, 28:
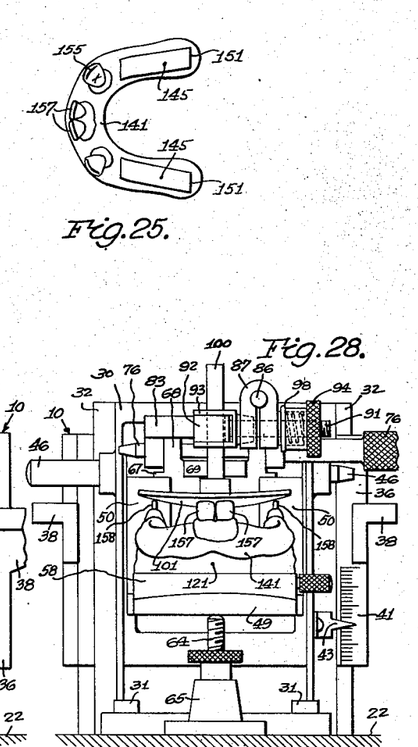
Fig. 25 is a plan view of the lower plate of Fig. 24.
Fig. 28 is a front elevational view of the showing in Fig. 27.
Figure 27:
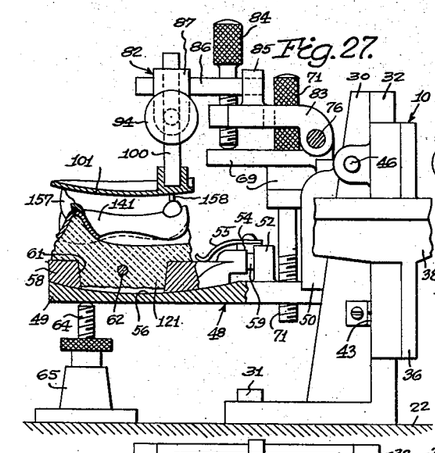
Fig. 27 is a side view of the new and improved articulator with the lower base plate of Fig. 26 in place therein, and showing the upper half of said articulator as having been replaced with a template device which is operable for universal movement and the working surface of which is in contact with the pins and anterior teeth on said base plate.

After the two pins 158 are positioned on the lower base plate at the common level shown in Fig. 26, and while said base plate is in position on the lower model 121, the upper half 74 of the articulator 10 is removed and replaced with the template device 82, as shown in Figs. 27 and 28, said device being adjusted so that its surface 101 is in contact with the lower anteriors 157 and the pins 158. As has been said before, the surface 101 is predetermined by application of known rules and data and as nearly as possible approaches and represents the occlusal plane of the average individual. To the art the element of which 101 is the working surface is known as a Spee template, but any template the working surface of which has the usual bi-angulation and resulting curvature is equally adaptable.

The pins 158 are removed from the base plate 141 after the template device 82 has been fixed in its adjusted position with its working surface 101 having been set to the level of said pins and anteriors 157, and the remaining, properly selected teeth are set into the base plate 141 to the surface 101 in their proper positions. The ordinary dentist is expected to be able to set the lower teeth in the lower base plate 141 in their proper relative positions and with their proper angularities especially with the surface 101 to guide him. This being done, the result is that the biting surfaces of the lower teeth now lie in the occlusal plane, the level of the latter approximating the level of that plane which has been used as a standard throughout the method and which was established directly from the patient's own mouth and bite.

When the lower teeth have been positioned on the lower base plate 141 to the surface 101 of the template device 82, as shown in Figs. 29 and 30, said device is removed from the articulator 10, the upper half 74 is replaced therein, the bite rim portions 150 are removed from the upper base plate 140—150—144 of Fig. 24, and the plate 140 is then placed in its proper position on the upper model 120 of the then closed articulator 10. The remaining, properly selected upper teeth are set into the upper plate 140 in accordance with dental skill and knowledge and with respect to the cuspal surfaces of the previously-set lower teeth, as shown in Fig. 31.

In setting the upper teeth to the lower teeth, as shown in Fig. 31, the dentist is able to move the casting 58 in and relative to its seat in the casting 49, the surfaces 56 and 60 therebetween being complementary and substantially identical in curvature to the template surface 101, and thereby reproduce at his will a movement of the lower denture relative to the upper denture which is substantially the same as the movement of the patient's own lower jaw relative to the upper jaw. This not only aids the dentist to set the upper teeth at their proper heights and angles but it also permits him to discover interferences, etc., between the cuspal eminences of the two dentures so that same can be readily and intelligently filed off or otherwise removed. However, after the plates 140 and 141 have gone through the stage of Fig. 31, the remaining steps necessary for forming the finished dentures comprise standard practice and are not, therefore, shown or described.

It is natural for the gum ridges of an individual's mouth carrying artificial teeth to recede during the course of years and thereby render the dentures ill-fitting. To cope with this inevitable situation Figs. 36 through 49 disclose steps whereby a new plate may be formed in accordance with the present condition of the patient's mouth and the teeth of the old plate reset onto this new plate in their original relative positions. These figures consider the upper plate only, but the steps which would be taken for making a new lower plate and setting the original teeth thereon are similar and embody only those necessary and obvious modifications. Figs. 36 through 49 will now be discussed.

Figure 36:
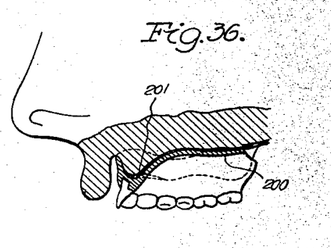
Fig. 36 is a view showing the first step of resetting a denture, the original denture being shown in the patient's mouth with plaster wash being used as a filler.

As shown in Fig. 36, the patient's original denture 200, after being removed from the mouth and its upper surface coated with plaster wash 201, is replaced into the mouth and the patient is instructed to bite. The wash 201 is applied to said denture for filling in and building up the void between the dome of the denture and the dome of the mouth and thereby providing a truer fit thereat, and also for filling in any undercutting which may occur at the gum ridge of the denture.

Figure 37:
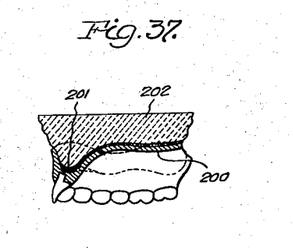
Fig. 37 is a view showing the step of making a model from the denture in Fig. 36.

In Fig. 37, a plaster model 202 is made in the usual manner from the denture 200, after the latter with the hardened plaster wash 201 therein is removed from the patient's mouth. This model 202 is then a representation of the true and present condition of the dome of the patient's mouth.

Figure 38:
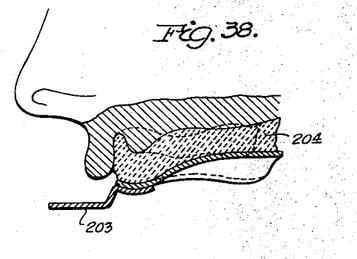
Fig. 38 is a view showing the step of obtaining an impression of the patient's mouth.

Then, in the ordinary manner and with the use of the usual spoon 203 and impression material, an impression 204 is taken of the patient's mouth in its entirety, as shown in Fig. 38. This step is taken for the purpose of recording those changes in the gum ridge and obtaining that total outline of the posterior section of the palate which were impossible of being recorded and obtained in Fig. 36.

Figure 39:
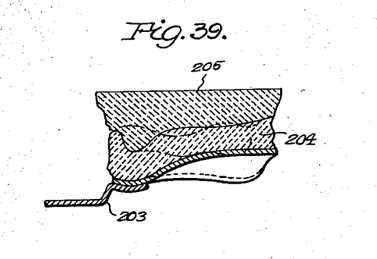
Fig. 39 is a view showing the step of making a model from the impression in Fig. 38.

In the ordinary manner, a model 205 of the usual plaster material is made from the impression 204, as shown in Fig. 39. This model 205 is then a representation of the true and present condition of the patient's mouth in its entirety.

Figures 40, 41, 42:
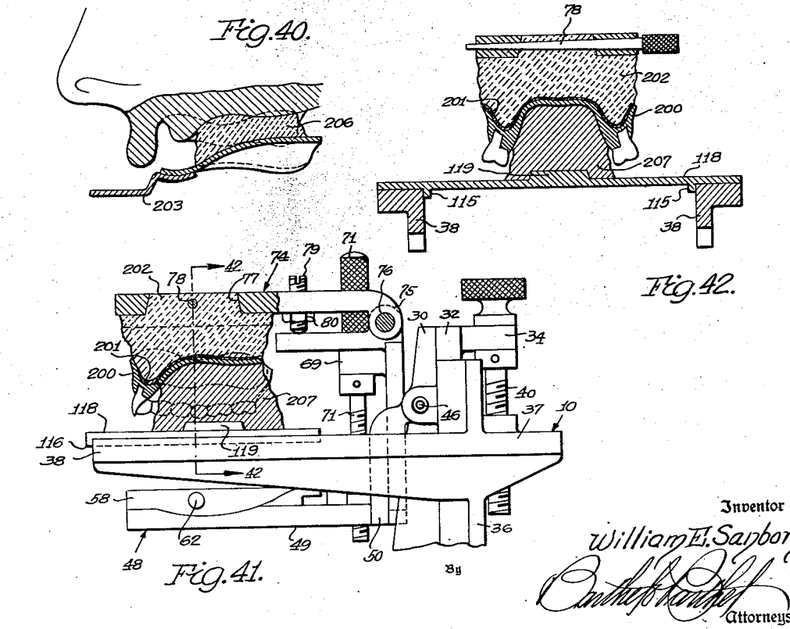
Fig. 40 is a view similar to Fig. 38 except that the impression taken is of the dome portion only of the mouth.
Fig. 41 is a side view of the novel and improved articulator with the denture of Fig. 36 and the model of Fig. 37 in place therein, there being shown a mass of clay for supporting said denture in its proper position with respect to said articulator, whereafter said model is properly positioned in said articulator with respect to said denture.
Fig. 42 is a sectional view taken along the lines 42—42 in Fig. 41.

Another impression 206 is taken of the patient's mouth, but said impression, it will be noted, is of the dome portion only of the mouth. This step is shown in Fig. 40. It will now be appreciated that the dome portions of the three models 202, 205 and 206 are identical in shape, each corresponding to the present shape of the dome of the patient's own mouth.

The articulator 10 is now resorted to, the horizontal plate 114 having been replaced by the plate 118, as shown in Figs. 41 and 42. The denture 200 of Fig. 36 is introduced to the articulator by placing the former substantially centrally of the lug 119 on plate 118 and maintaining said denture in an elevated position with respect to said lug by employing a mass of clay, or other workable material, 207, between said plate and the dome of said denture. It will be noted in said figures that the denture 200 is supported at its dome by the clay 207 in such a position that the plane of the occlusal surface of the teeth of the denture is substantially horizontal and parallel with the plate 118 and slightly above the lug 119. The model 202 of Fig. 37 is then placed into the positioned denture 200, dome against dome, the upper half 74 of the articulator is closed to a horizontal position, and the model 202 is then built into the opening 77 in said closed upper half 74 by means of suitable plaster or other material.

Since the relationship to be established in Figs. 41 and 42 is exclusively that between the domes of the denture 200 and the model 202, any undercutting of the peripheral gum portion of the denture 200, not already taken care of by the wash 201, may have been filled in with putty, paper or some other material (not shown) which will permit ready and easy separation between said model and denture after the dome portions thereof have been fitted together, as in Figs. 41 and 42.

Figure 43:
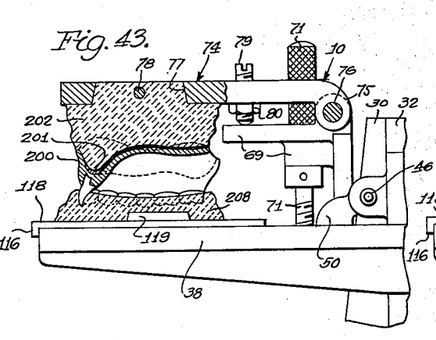
Fig. 43 is a view similar to Fig. 41 but showing the mass of supporting clay as having been replaced by a mass of impression-taking material, and also showing the step of taking an impression of the teeth in the denture carried by the model of Fig. 37 in the articulator.

When the plaster employed for building the model 202 into the articulator 10, as shown in Figs. 41 and 42, has become set, the mass of clay 207 is removed from the plate 118 and denture 200 and replaced with a mass of plaster 208, as shown in Fig. 43. This mass of plaster 208 is placed on the plate 118 over and around the lug 119 and has an upper surface area larger than and underlying the projected area of the denture 200 so that, when the upper half 74 of the articulator 10, which is carrying the model 202 with the denture 200 thereupon, is closed, an impression of the teeth in said denture will be left in said plaster 208. This impression in the plaster 208 is of the occlusal surface of Fig. 41 and is a permanent record thereof (because of the depression made therein by the lug 119) with respect to the present relationship between the plate 118 and the dome of the model 202.

Figure 44:
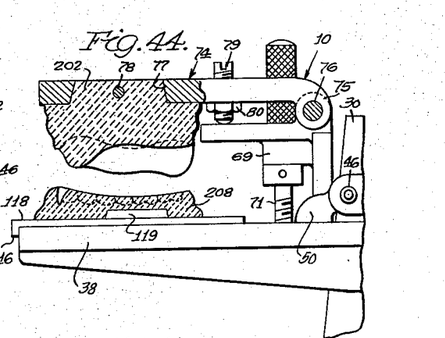
Fig. 44 is a view similar to Fig. 43 but showing the denture as having been removed from its model.

Fig. 44 merely shows the denture 200 of Fig. 43 as having been removed from the model 202. And, Fig. 45 merely shows a plan view of this impression on the plate 118.

Figure 45:
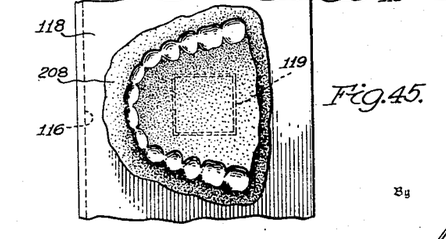
Fig. 45 is a plan view of the impression taken in Figs. 43 and 44.
Figure 46:
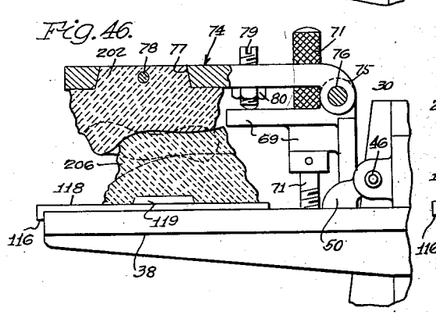
Fig. 46 is a side view of the novel and improved articulator with the model of Fig. 37 and the impression of Fig. 40 in proper position and relationship therein.

The impression 208 of Figs. 43, 44 and 45 is now removed from the horizontal plate 118, and the impression 206 of Fig. 40, taken of the dome of the patient's mouth, is fitted into its proper position up against the dome of the model 202 already in the articulator. This impression 206 can, without error, be termed a model. While in this position, and with the articulator closed, the impression or model 206 is built onto the plate 118 about the lug 119 by means of plaster or other setting material, as shown in Fig. 46. In other words, the relationship of the impression or model 206 to the model 202 and to the plate 118 is established in the articulator in Fig. 46.

Figure 47:
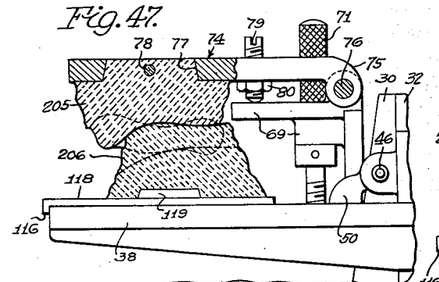
Fig. 47 is a view similar to Fig. 46 except that the model in the upper half of the articulator has been replaced with the model of Fig. 39.

It should be readily appreciated that the performance of the showing in Fig. 46 results in establishing the impression or model 206 on the horizontal plate 118 so that the formed surface of said impression is spaced from said plate a distance equal to that between the dome of the model 202 and the plate 118 in Fig. 44. This distance was arbitrarily selected in Fig. 41 and has been maintained thereafter. And, with this distance or relationship between the dome of model 202 and the horizontal planar surface of plate 118 having been maintained or established in Fig. 46 and the impression or model 206 having been built-up on said plate in accordance with said distance, the model 202, which was made from the patient's own denture 200 in Fig. 37, is removed from the upper half 74 of the articulator 10 and replaced by the model 205, which was made from the impression 204 in Fig. 39 taken of the patient's own mouth in its entirety in Fig. 38, model 205 being fitted onto the already-positioned impression or model 206 in its proper position with respect thereto and then built into the opening 77 in the closed upper half 74 of the articulator, as shown in Fig. 47. What is presented in Fig. 47 is the positioning of and relationship between, to the planar surface of plate 118, the surface of the dome of the impression 206 taken of the dome of the patient's own mouth and the surface of the dome of the model 205 made from the impression taken of the patient's entire mouth.

Figure 48:
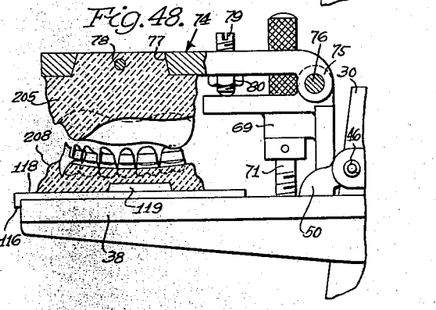
Fig. 48 is a view similar to Fig. 44 except that the upper model has been replaced by the upper model of Fig. 47 and the teeth of the denture of Fig. 36, after being removed therefrom, are set into the concavities therefor in the impression of Fig. 44.

After the model 205 has been built into the upper half of the articulator in accordance with the teaching of Fig. 47, the impression or model 206 is removed therefrom, the impression 208 of Figs. 43 and 44 being returned to its original position on the plate 118 over the lug 119. Then, as shown in Fig. 48, the teeth in the denture 200 of Figs. 36, 37, 41, 42 and 43 are removed therefrom and set in their respective concavities in the impression 208.

Figure 49:
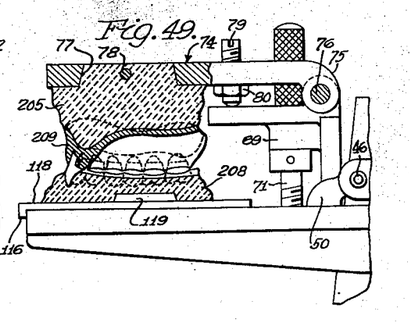
Fig. 49 is a view of the final stage of resetting the denture of Fig. 36, prior to its final processing, and showing the formation of a new base plate in accordance with the upper model and to the teeth in the positioned impression, said teeth having been removed from the original denture in Fig. 36 and placed in their proper concavities in the impression in Fig. 49 so as to be set up on said base plate while governing the formation of the latter.

Then, with the articulator closed, and with the model 205 and the impression 208 in place, and with the teeth from the denture 200 in the concavities therefor in said impression, a new base plate 209 of the usual material is formed in accordance with the model 205 and to and for the teeth in the impression 208, as shown in Fig. 49, wax being used to set up the teeth to the plate. It is believed average dental skill will permit the operator to form the plate 209 in the foregoing manner so that, when completed, the plate 209 will have its proper fit with respect to the model 205 (which represents the present condition of the patient's upper jaw and its true relationship to the lower jaw and teeth therein) and the patient's former artificial teeth will be set into this new plate in their original relative positions.

This being done, the plate 209 is ready for final processing, the steps of which are well known and will not, therefore, be described.

Although the invention has been described with some detail it is not intended that such description be definitive of the limits of the inventive idea. The right is reserved to make such changes in the steps taken and details of construction of the apparatus employed as will come within the purview of the attached claims.

What I claim is:

1. In an articulator for making dentures, an upstanding support having pin-receiving means, a second support also having pin-receiving means, a pair of integral arms carried by said first-named support for vertical movement relatively thereto and extending therefrom horizontally and in lateral spaced relation to each other, upper work supporting means above and intermediate said arms, pin means carried by said work supporting means within said second-named pin-receiving means for providing an axis about which said work supporting means is movable relatively to said second support and to said arms, lower work supporting means below and intermediate said arms, cooperating means formed on said lower work supporting means and said second support to enable the latter and said upper work supporting means to move rectilinearly as a unit relatively to said lower work supporting means and to said arms, pin means carried by said lower work supporting means within said first-named pin-receiving means for providing an axis about which said lower work supporting means, said upper work supporting means and said second support are movable as a unit relatively to said upstanding support and to said arms, and a plate removably carried horizontally on said arms.

2. In an articulator for making dentures, an upstanding support having pin-receiving means, a second support also having pin-receiving means and formed with a horizontally extending ledge, upper work supporting means above said ledge, pin means carried by said work supporting means within said second-named pin-receiving means for providing an axis about which said work supporting means is movable relatively to said second support and to said ledge, stop means carried by said work supporting means and cooperable with said ledge for limiting the movement of said work supporting means about said axis in one direction, lower work supporting means, cooperating means formed on said lower work supporting means and said second support to enable the latter and said upper work supporting means to move rectilinearly as a unit relatively to said lower work supporting means, and pin means carried by said lower work supporting means within said first-named pin-receiving means for providing an axis about which said lower work supporting means, said upper work supporting means and said second support are movable as a unit relatively to said upstanding support.

WILLIAM E. SANBORN.